US012687282B2

(12) United States Patent
Colton et al.

(10) Patent No.: US 12,687,282 B2
(45) **Date of Patent: *Jul. 21, 2026**

(54) PORTABLE FLASHLIGHT

(71) Applicant: Black & Decker Inc., New Britain, CT (US)

(72) Inventors: Mark Colton, Annapolis, MD (US); Jonathan Kirkpatrick, Baldwin, MD (US); Xiaotian Zeng, Suzhou (CN); Karen M. Baumeister, Jarrettsville, MD (US); Ling Yang, Suzhou (CN); Timothy J. Payne, Colombus, OH (US)

(73) Assignee: Black & Decker Inc., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/263,012

(22) Filed: Jul. 8, 2025

(65) Prior Publication Data

US 2025/0334256 A1 Oct. 30, 2025

Related U.S. Application Data

(63) Continuation of application No. 18/314,520, filed on May 9, 2023, now Pat. No. 12,385,630.

(Continued)

(51) Int. Cl.

*F21V 21/096* (2006.01)
*F21L 4/00* (2006.01)

(Continued)

(52) U.S. Cl.

CPC ............ *F21V 21/0965* (2013.01); *F21L 4/00* (2013.01); *F21L 4/005* (2013.01); *F21L 4/025* (2013.01);

(Continued)

(58) Field of Classification Search

CPC ............ F21L 4/022; F21L 4/025; F21L 4/027
See application file for complete search history.

(56) References Cited

U.S. PATENT DOCUMENTS 8,919,988 B2 * 12/2014 Unger ........................ F21L 4/00 362/183
8,985,791 B1 * 3/2015 Hinzmann .............. F21L 4/027 362/2

(Continued)

FOREIGN PATENT DOCUMENTS

CN 210118658 U * 2/2020

*Primary Examiner* — Alexander K Garlen
(74) *Attorney, Agent, or Firm* — Brake Hughes Bellermann LLP

(57) ABSTRACT

A portable flashlight apparatus is provided that is light-weight and compact to provide enhanced illumination in an ambient environment when placed in one of a plurality of operating modes. The portable flashlight apparatus includes a base housing defining an interior space and which includes structurally defined regions that include a front housing region, a rear housing region, an intermediate housing region extending between the front housing region and the rear housing region and an end cap that closes the interior space at the rear housing region. A light module includes a first light source operable to emit illuminating light, a second light source operable to emit laser light, and a third light source operable to emit illuminating light. A magnet are arranged at the rear face of the end cap, and is operable to magnetically bias the base housing on a working surface or support surface having magnetic properties.

17 Claims, 8 Drawing Sheets

Related U.S. Application Data

(60) Provisional application No. 63/345,291, filed on May 24, 2022.

(51) Int. Cl.

| | |
|---|---|
| ***F21L 4/02*** | (2006.01) |
| ***F21L 4/04*** | (2006.01) |
| ***F21L 4/08*** | (2006.01) |
| ***F21V 21/088*** | (2006.01) |
| ***F21V 23/04*** | (2006.01) |
| ***F21Y 115/10*** | (2016.01) |
| ***F21Y 115/30*** | (2016.01) |

(52) U.S. Cl.

CPC ................. *F21L 4/027* (2013.01); *F21L 4/04* (2013.01); *F21L 4/08* (2013.01); *F21L 4/085* (2013.01); *F21V 21/0885* (2013.01); *F21V 23/0414* (2013.01); *F21V 23/0421* (2013.01); *F21V 23/0428* (2013.01); *F21Y 2115/10* (2016.08); *F21Y 2115/30* (2016.08)

(56) References Cited

U.S. PATENT DOCUMENTS

| | | | | |
|---|---|---|---|---|
| 2005/0237734 | A1* | 10/2005 | Krieger .................. | F21L 4/027 362/157 |
| 2008/0211428 | A1* | 9/2008 | Bayat ...................... | F21L 4/027 338/334 |
| 2009/0261737 | A1* | 10/2009 | Wright .................. | H05B 47/17 315/297 |
| 2010/0254135 | A1* | 10/2010 | Bayat ...................... | F21V 15/01 362/326 |
| 2018/0259136 | A1* | 9/2018 | Horne ................ | F21V 23/0414 |

* cited by examiner

PORTABLE FLASHLIGHT

CROSS-REFERENCE TO RELATED APPLICATIONS

This application is a continuation application of U.S. application Ser. No. 18/314,520, filed May 9, 2023, entitled PORTABLE FLASHLIGHT, which claims priority to and the benefit of U.S. Provisional Application No. 63/345,291, filed on May 24, 2022, entitled PORTABLE FLASHLIGHT, the entire contents of which are incorporated herein by reference.

TECHNICAL FIELD

One or more embodiments of the present disclosure relate generally to a portable flashlight apparatus that provides illumination in an ambient environment when placed in one of a plurality of operating modes.

BACKGROUND

Portable flashlights are used to provide selective illumination in relatively small access spaces and/or areas.

SUMMARY

In accordance with one or more example embodiments, a portable flashlight apparatus is provided that is lightweight and compact to provide enhanced illumination in an ambient environment when placed in one of a plurality of operating modes. The portable flashlight apparatus includes a base housing and a light module.

In accordance with one or more example embodiments, the base housing includes a plurality of structurally-defined regions that include a front housing region at a front end of the portable flashlight apparatus, a rear housing region at a rear end of the portable flashlight apparatus, and an intermediate housing region extending between the front housing region and the rear housing region. The base housing defines an interior space or opening to receive a holder upon which is mounted the light module that supports a plurality of light sources operable to illuminate light, and a rechargeable power source for providing power to the light sources.

In accordance with one or more example embodiments, one or more seal members, including a first seal member arranged between the rear housing region and an end cap, and a second seal member arranged at the front housing region, are provided to prevent moisture, debris, particles, etc. from entering into the interior space of the base housing and adversely affecting the performance of the light module and relevant components arranged in the interior space.

In accordance with one or more example embodiments, the outer perimeter of the intermediate housing region defines a gripping surface that permits a user to maintain a grip of the base housing. The front housing region and the rear housing region respectively have an outer perimeter that is greater than the outer perimeter of the intermediate housing region, thereby permitting a user to maintain an enhanced grip of the base housing during use and/or transport of the portable flashlight apparatus.

In accordance with one or more example embodiments, the portable flashlight apparatus includes a clip member that extends longitudinally along outer sidewall surfaces of the rear housing region and the intermediate housing region to facilitate secure attachment of the portable flashlight apparatus to a user. A hook member is arranged on a rear face of the end cap and is pivotably moveable between a stowed position on the rear face of the end cap and a deployed position in a direction away from the rear face of the end cap to facilitate hanging or suspension of the portable flashlight apparatus at a support point.

In accordance with one or more example embodiments, a magnetic bias is provided to anchor or maintain the portable flashlight apparatus on a working surface or support surface having magnetic properties. One or more magnetic elements are integrated in, arranged on, or embedded in the rear face of the end cap to facilitate a magnetic attraction between the base housing and the working surface or support surface that magnetically biases the base housing on the working surface or support surface. In that way, hands-free use of the portable flashlight apparatus by a user is facilitated.

In accordance with one or more example embodiments, the light module is arranged at the front housing region, and comprises a plurality of light sources. The light sources include a first light source arranged at a front face of the front housing region. The first light source comprises one or more LEDs operable to emit illuminating light (e.g., in a spotlight operating mode) from the front housing region in a direction parallel to the longitudinal axis of the base housing. A second light source is arranged at a front face of the front housing region 201. The second light source comprises a laser operable to emit laser light from the front housing region in a direction parallel to the longitudinal axis of the base housing. A third light source is arranged at a sidewall of the front housing region. The third light source comprises one or more LEDs operable to emit illuminating light (e.g., in a floodlight operating mode) from the front housing region in a direction perpendicular to the longitudinal axis of the base housing.

In accordance with one or more example embodiments, the color temperature of light emitted by the LEDs of the first light source and the third light source is 4,500 K, respectively.

In accordance with one or more example embodiments, the rechargeable power source is arranged at the intermediate housing region. A power charging port is located on an outer sidewall surface of the intermediate housing region to facilitate recharging of the rechargeable power source. The power charging port comprises a USB-C (also known as USB Type-C)_port that facilitates a wired connection with a male plug of a USB-C charging cable for recharging of the rechargeable power source. The USB-C port is operable to facilitate a total charging time of 60 minutes to reach a full charged state of the rechargeable power source.

In accordance with one or more example embodiments, a charge indicator is located on the outer sidewall surface of the intermediate housing region to visually indicate a charge status of the rechargeable power source during a recharging sequence. The charge indicator is operable to illuminate a single color that corresponds to the charge status of the rechargeable power source. Alternatively, the charge indicator is operable to illuminate a plurality of colors that correspond to the charge status of the rechargeable power source.

In accordance with one or more example embodiments, the portable flashlight apparatus includes a user interface (UI) comprising a first control switch member and a second control switch member arranged adjacent to the first control switch member on the outer sidewall surface of the front housing region.

In accordance with one or more example embodiments, the first control switch member is operable to control activation/deactivation of the LEDs of the first light source and the third light source, respectively between a plurality of operating modes. The second control switch member is operable to control activation/deactivation of the laser light of the second light source between the plurality of operating modes.

In accordance with one or more example embodiments, the one or more LEDs of the first light source and the third light source are operable for manual control by a user via the first control switch member to emit illuminating light. The first control switch member is also operable to control an output/intensity of light emitted by the first light source and the third light source between the plurality of operating modes. For example, in a first or maximum (high) spotlight operating mode of the first light source, an output of the first light source is 1200 lumens with a runtime of 4 hours. In a second or maximum (low) spotlight operating mode, an output of the first light source is 1000 lumens with a runtime of 2 hours. In a third or minimum (high) spotlight operating mode, an output of the first light source is 200 lumens with a runtime of 8 hours. In a fourth or minimum (low) spotlight operating mode, an output of the first light source is 150 lumens with a runtime of 6 hours. In a fifth or maximum floodlight operating mode, an output of the third light source is 250 lumens with a runtime of 6 hours. In a sixth or minimum floodlight operating mode, an output of the third light source is 150 lumens with a runtime of 4 hours.

DRAWINGS

The various advantages of one or more exemplary embodiments will become apparent to one skilled in the art by reading the following specification and appended claims, and by referencing the following drawings, in which:

DESCRIPTION

Figure 1:
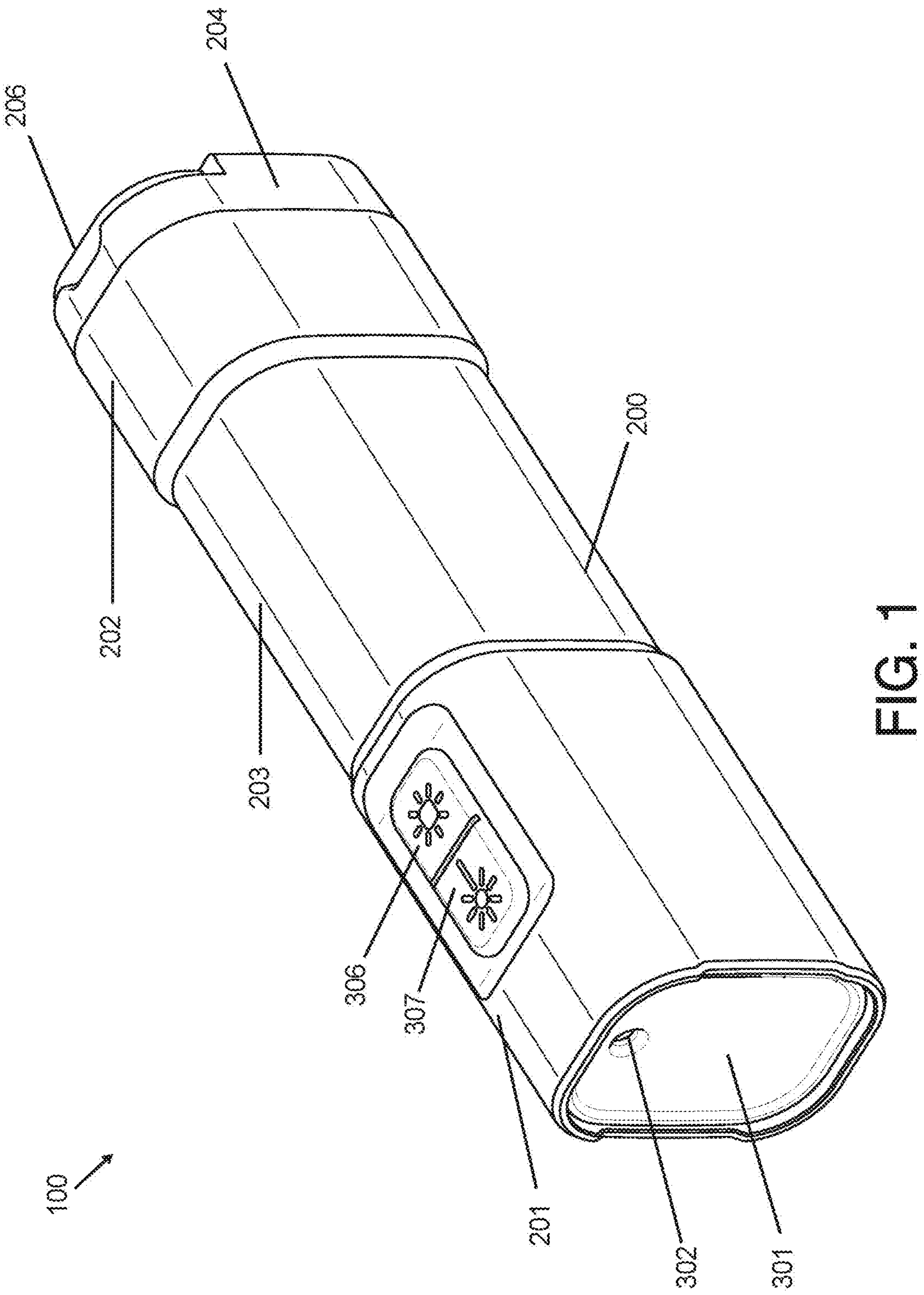
FIG. 1 illustrates a top, perspective view of an example portable flashlight apparatus, in accordance with one or more embodiments set forth, shown, and described herein.

Turning to the figures, in which FIGS. 1-9 illustrates an example portable flashlight apparatus 100, in accordance with one or more embodiments. The portable flashlight apparatus 100 may comprise one or more operational elements. Some of the possible operational elements of the portable flashlight apparatus 100 are illustrated in FIG. 1 and will now be described. It will be understood that it is not necessary for the portable flashlight apparatus 100 to incorporate all the elements illustrated in the figures set forth, and/or described herein. The portable flashlight apparatus 100 may have any combination of the various elements illustrated in FIG. 1. Moreover, the portable flashlight apparatus 100 may have additional operational elements to those illustrated in FIG. 1.

As illustrated in FIG. 1, the example portable flashlight apparatus 100 comprises a base housing 200 and a light module 300.

Base Housing

Figure 2:
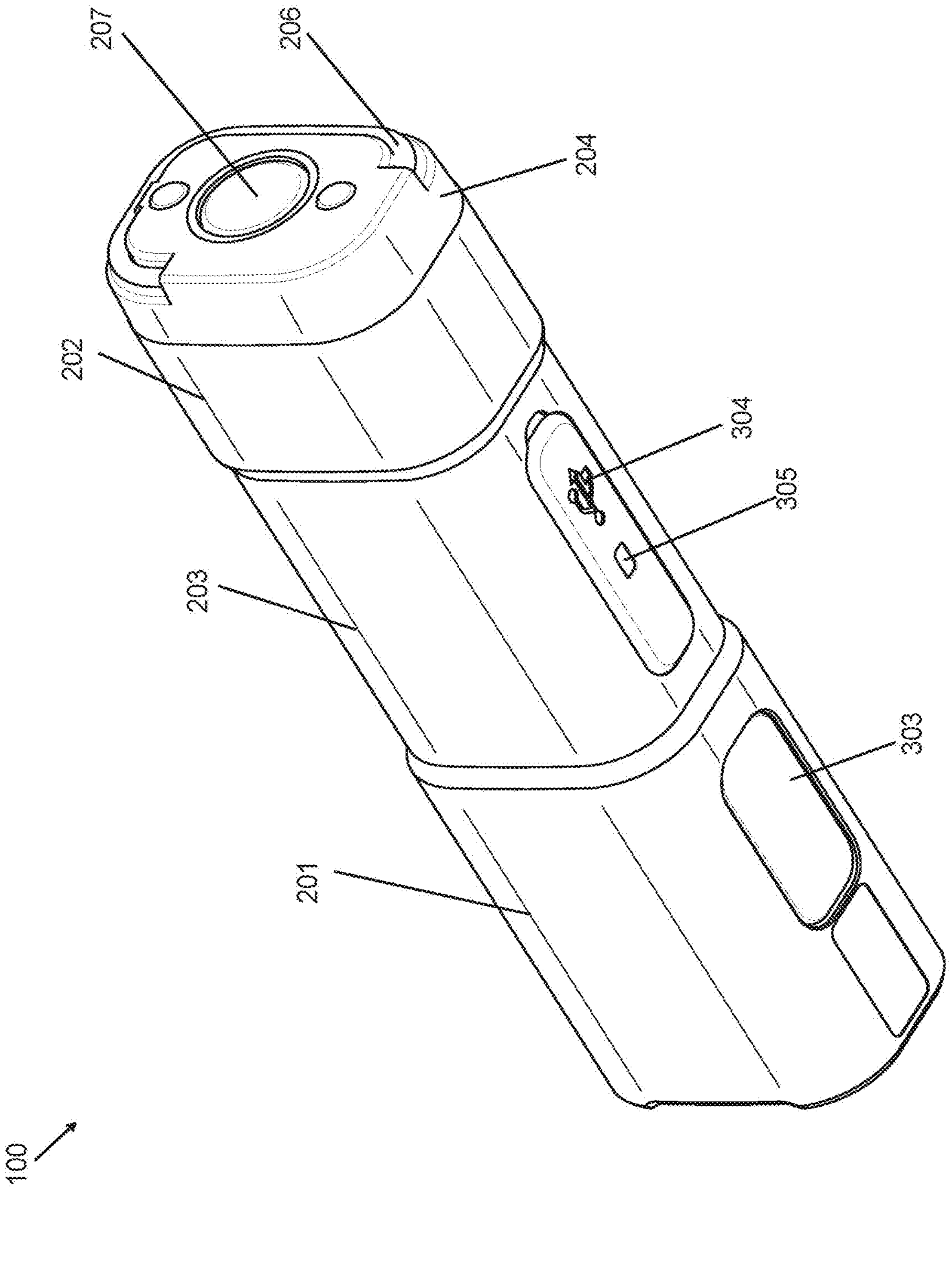
FIG. 2 illustrates a bottom, perspective view of the example portable flashlight apparatus of FIG. 1.

As illustrated in FIGS. 1 and 2, the base housing 200 includes an elongated body having a plurality of structurally-defined regions that include a front housing region 201 at a front end of the portable flashlight apparatus 100, a rear housing region 202 at a rear end of the portable flashlight apparatus 100, and an intermediate housing region 203 extending between the front housing region 201 and the rear housing region 202.

Figure 9:
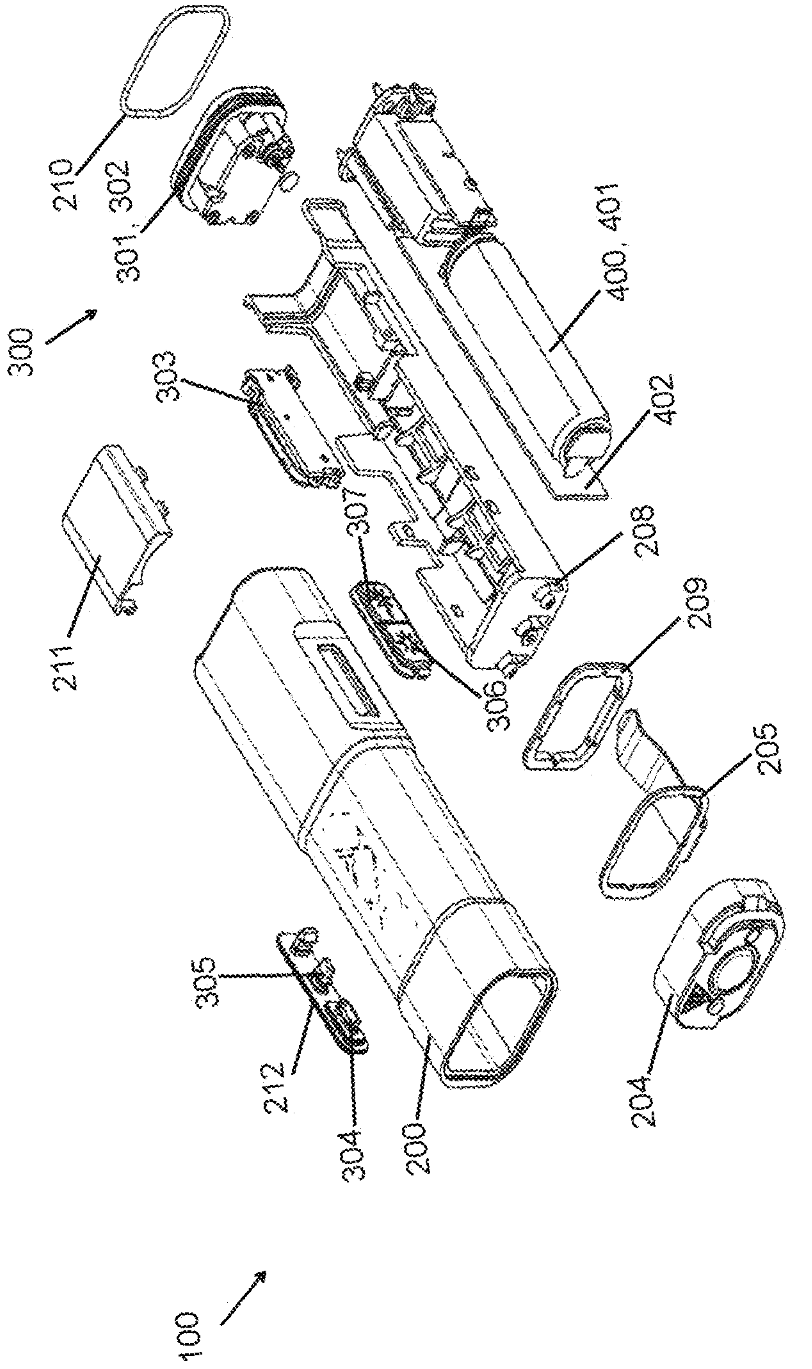
FIG. 9 illustrates an exploded view of the example portable flashlight apparatus of FIG. 1.

As illustrated in FIG. 9, the base housing 200 defines an interior space or opening to receive a holder 208 upon which is mounted the light module 300 which supports a plurality of light sources 301, 302, 303 operable to illuminate light, and a rechargeable power source 400 for providing power to the light sources.

A first seal member 209 is arranged between the rear housing region 202 and an end cap 204, and a second seal member 210 is arranged at the front housing region 201 to prevent moisture, debris, particles, etc. from entering into the interior space of the base housing 200 and adversely affecting the performance of the light module 300 and relevant components arranged in the interior space.

The base housing 200 may be composed in whole or in part of a lightweight metal such as, for example, aluminum. Embodiments, however, are not limited thereto, and thus, this disclosure contemplates the base housing 200 being composed of any suitable material that falls within the spirit and scope of the principles of this disclosure. Although the illustrated example embodiments feature the base housing 200 having a generally rectangular cross-section, embodiments are not limited thereto. This disclosure contemplates the base housing 200 having any geometric cross-section that will fall within the spirit and scope of the principles of this disclosure.

The outer perimeter of the intermediate housing region 203 defines a gripping surface that permits a user to maintain a grip of the base housing 200. The front housing region 201 and the rear housing region 202 respectively have an outer perimeter that is greater than the outer perimeter of the intermediate housing region 203 to permit a user to maintain an enhanced grip of the base housing 200 during use and/or transport of the portable flashlight apparatus 100.

Figure 4:
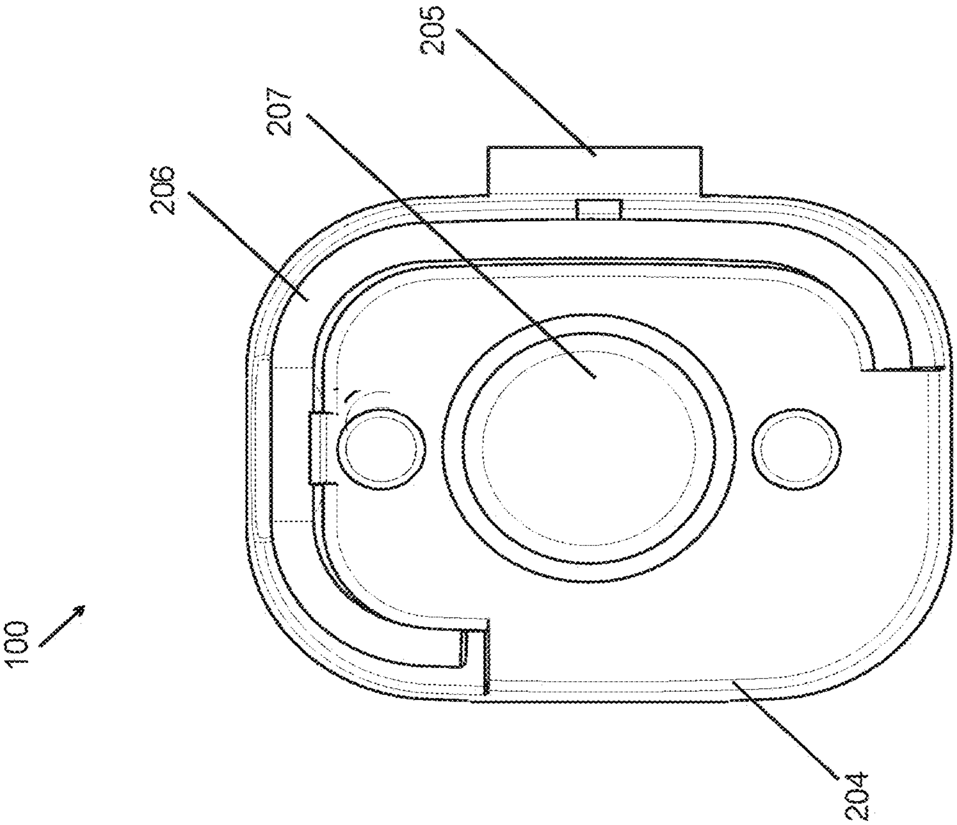
FIG. 4 illustrates a rear view of the example portable flashlight apparatus of FIG. 1.
Figure 3:
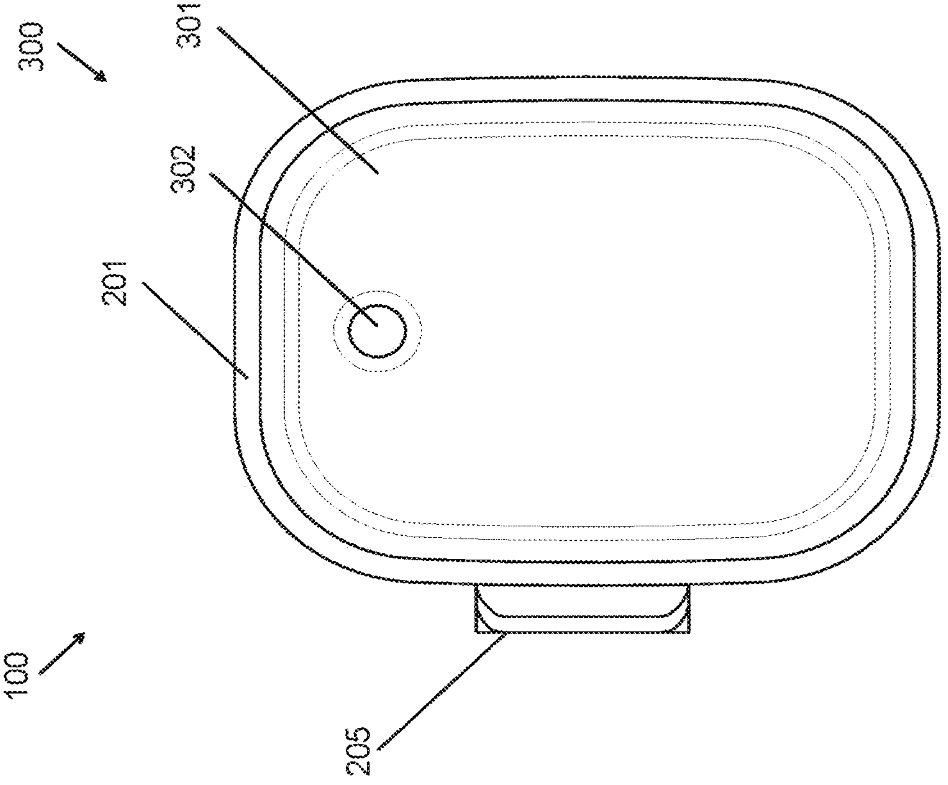
FIG. 3 illustrates a front view of the example portable flashlight apparatus of FIG. 1.
Figure 5:
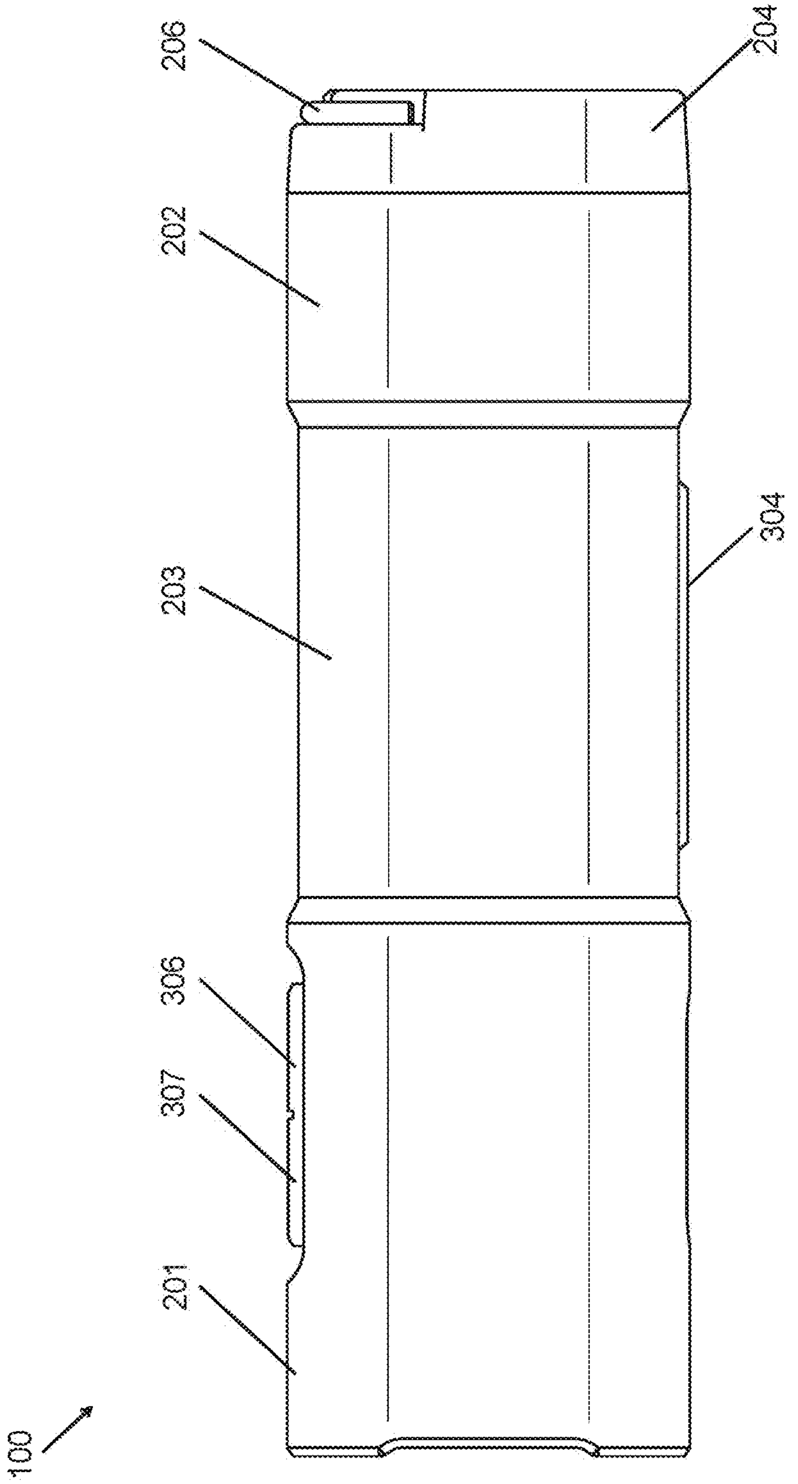
FIG. 5 illustrates a side view of the example portable flashlight apparatus of FIG. 1.
Figure 6:
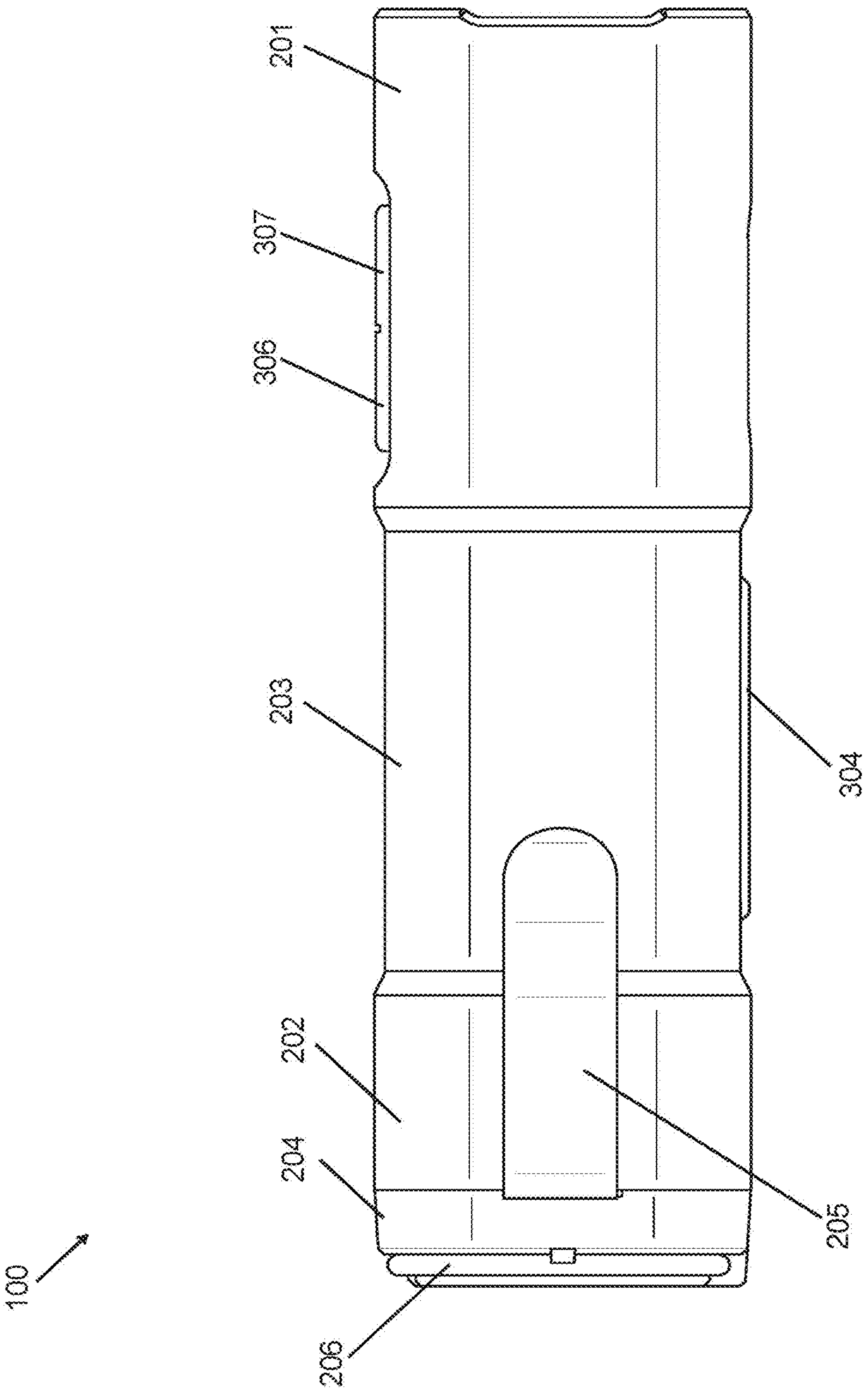
FIG. 6 illustrates a side view of the example portable flashlight apparatus of FIG. 1.
Figure 7:
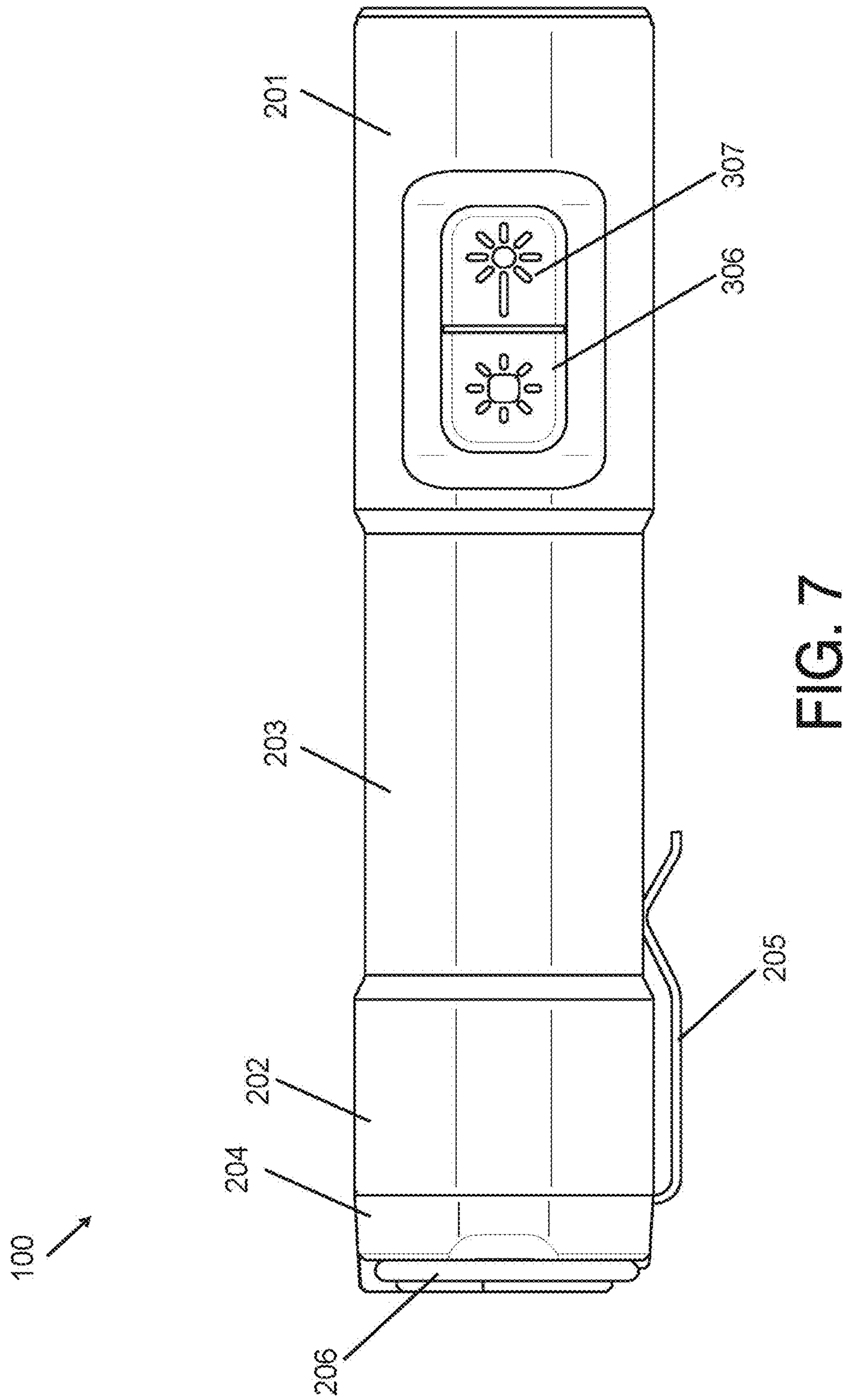
FIG. 7 illustrates a top view of the example portable flashlight apparatus of FIG. 1.
Figure 8:
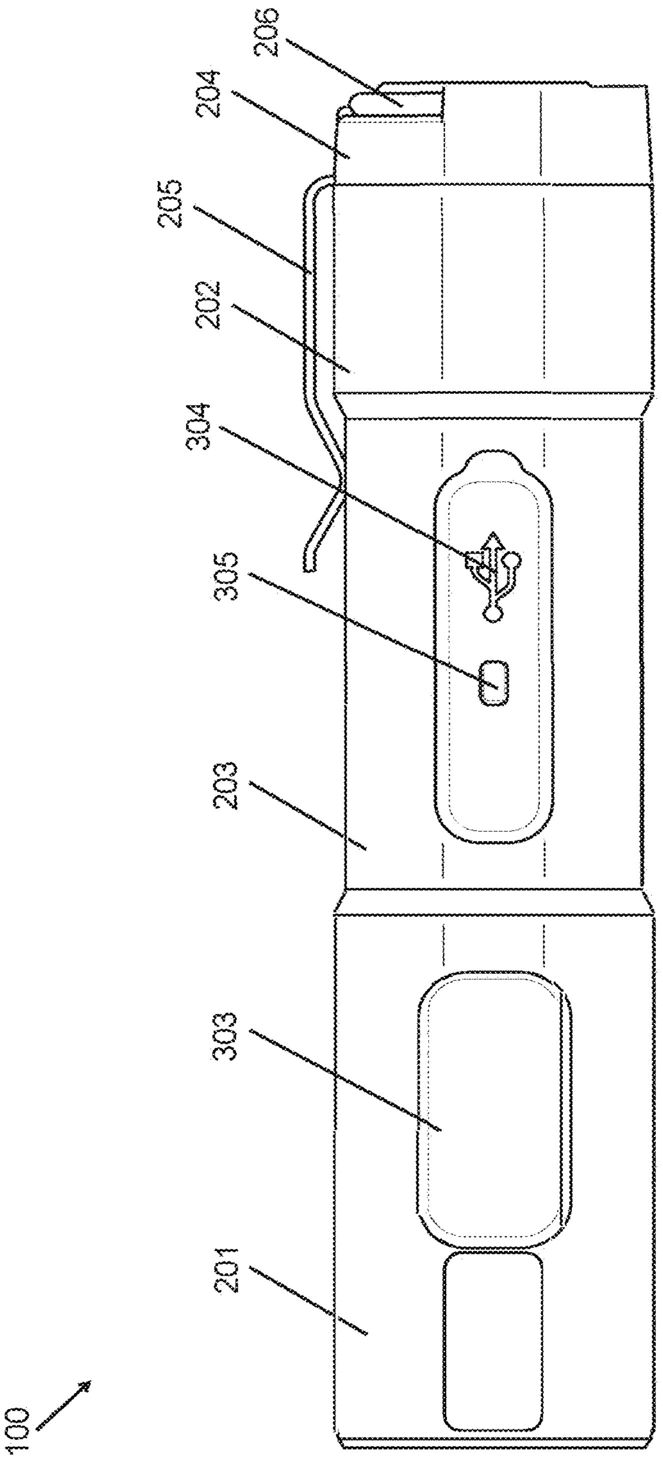
FIG. 8 illustrates a bottom view of the example portable flashlight apparatus of FIG. 1.

As illustrated in FIGS. 3, 4 and 9, a clip member 205 extends longitudinally along outer sidewall surfaces of the rear housing region 202 and the intermediate housing region 203 to facilitate secure attachment of the portable flashlight apparatus 100 to a user. A hook member 206 is arranged on a rear face of the end cap 204 and is pivotably moveable between a stowed position on the rear face of the end cap 204 and a deployed position in a direction away from the rear face of the end cap 204 in order to facilitate hanging or suspension of the portable flashlight apparatus 100 at a support point.

A magnetic bias is provided to anchor or maintain the portable flashlight apparatus 100 on a working surface or support surface having magnetic properties. One or more magnetic elements 207 are integrated in, arranged on, or embedded in the rear face of the end cap 204. The one or more magnetic elements 207 facilitate a magnetic attraction between the base housing 200 and the working surface or support surface that magnetically biases the base housing 200 on the working surface or support surface. In that way, hands-free use of the portable flashlight apparatus 100 is facilitated.

Light Module

As illustrated in FIGS. 3 and 4, the light module 300 is arranged at the front housing region 201 and comprises a plurality of light sources. The light sources include a first light source 301 arranged at a front face of the front housing region 201, and which comprises one or more LEDs operable to emit illuminating light (e.g., in a spotlight operating mode) from the front housing region 201 in a direction parallel to the longitudinal axis of the base housing 200. A second light source 302 is arranged at a front face of the front housing region 201 and comprises a laser operable to emit laser light from the front housing region 201 in a direction parallel to the longitudinal axis of the base housing 200. A third light source 303 is arranged at a sidewall of the front housing region 201 and comprises one or more LEDs operable to emit illuminating light (e.g., in a floodlight operating mode) from the front housing region 201 in a direction perpendicular to the longitudinal axis of the base housing 200. The one or more LEDs of the first light source 301 are arranged in an array on a printed circuit board (PCB). During activation of the first light source 301, heat generated by the LEDs is transmitted to a heat sink, which radiates the heat away from the PCB. The one or more LEDs of the third light source 303 are arranged in an array on a second PCB. During activation of the second light source 302, heat generated by the LEDs is transmitted to the heat sink, which radiates the heat away from the second PCB.

In accordance with one or more example embodiments, the color temperature of light emitted by the LEDs of the first light source 301 and the third light source 303 is in the range of approximately 3,000 K to 6,000 K, preferably in the range of approximately 3,500K to 5,500 K, more preferably in the range of approximately 4,000K to 5,00, and even more preferably approximately 4,500 K, respectively. Embodiments, however, are not limited thereto, and thus, this disclosure contemplates the light emitted by the LEDs may have any suitable color temperature that falls within the spirit and scope of the principles of this disclosure.

The rechargeable power source 400 is arranged at the intermediate housing region 203, and comprises a rechargeable battery 401 that is mounted on a PCB 402 and covered by a battery cover member 211. The rechargeable battery 401 may be one or more 4-volt lithium-based battery cells having a capacity of at least 3 amp·hours. The battery cells are illustratively cylindrical, though other forms of battery cell such as pouch cells may be alternatively utilized.

A power charging port 304 covered by a power charge port cover 212 is located on an outer sidewall surface of the intermediate housing region 203 to facilitate recharging of the rechargeable power source 400. The power charging port 304 comprises a USB-C port that facilitates a wired connection with a male plug of a USB-C charging cable for recharging of the rechargeable power source 400. The USB-C port is operable to facilitate a charge rate of 15 watts and a total charging time of 60 minutes to reach a full charged state of the rechargeable power source 400/401.

A charge indicator 305 is located on the outer sidewall surface of the intermediate housing region 203 to visually indicate a charge status of the rechargeable power source 400 during a recharging sequence. The charge indicator 305 is operable to illuminate a single color that corresponds to the charge status of the rechargeable power source 400. Alternatively, the charge indicator 305 is operable to illuminate a plurality of colors that correspond to the charge status of the rechargeable power source 400.

The portable flashlight apparatus 100 includes a user interface (UI) comprising a first control switch member 306 located on an outer sidewall surface of the front housing region 201 to control activation/deactivation of the LEDs of the first light source 301 and the third light source 303, respectively between a plurality of operating modes. The one or more LEDs of the first light source 301 and the third light source 303 are operable for manual control by a user via the first control switch member 306 to emit illuminating light. The first control switch member 306 is also operable to control an output/intensity of light emitted by the first light source 301 and the third light source 303 between the plurality of operating modes.

For example, in a first or maximum (high) spotlight operating mode of the first light source 301, an output of the first light source 301 is at least approximately 100 lumens, preferably at least 1200 lumens, with a runtime of at least approximately 2 hours, preferably at least approximately 4 hours. In a second or minimum (low) spotlight operating mode, an output of the first light source 301 is at least approximately 150 lumens, preferably at least 200 lumens, with a runtime of at least approximately 6 hours, preferably at least approximately 8 hours. In a third or floodlight operating mode, an output of the third light source 303 is at least approximately 300 lumens, preferably at least approximately 400 lumens, with a runtime of at least approximately 4 hours, preferably at least approximately 6 hours. In a fourth or hybrid operating mode, the light output is at least approximately 300 lumens, preferably at least approximately 400 lumens, with a runtime of at least approximately 3 hours, preferably at least approximately 5 hours. In at least the first operating mode, the light from the third light source 303 is capable of reaching a beam distance of at least approximately 150 meters, preferably at least approximately 175 meters.

The UI also includes a second control switch member 307 arranged adjacent to the first control switch member 306 on the outer sidewall surface of the front housing region 201 to control activation/deactivation of the laser light of the second light source 302 between the plurality of operating modes.

ADDITIONAL NOTES AND EXAMPLES

Example 1 may include a portable flashlight apparatus, comprising: a base housing defining an interior space, the base housing including structurally defined regions that include a front housing region, a rear housing region, an intermediate housing region extending between the front housing region and the rear housing region and an end cap that closes the interior space at the rear housing region; a light module arranged at the front housing region and operable between a plurality of operating modes, the light module including a first light source operable to emit illuminating light from the front housing region in a direction parallel to the longitudinal axis of the base housing, a second light source operable to emit laser light from the front housing region in a direction parallel to the longitudinal axis of the base housing, and a third light source operable to emit illuminating light from the front housing region in a direction perpendicular to the longitudinal axis of the base housing; a clip member extending longitudinally along outer sidewall surfaces of the rear housing region and the intermediate housing region to facilitate secure attachment of the portable flashlight apparatus to a user; a hook member, arranged on a rear face of the end cap and pivotably moveable between a stowed position on the rear face of the end cap and a deployed position in a direction away from the rear face of the end cap in order to facilitate hanging or suspension of the portable flashlight apparatus at a support point; and one or more magnetic elements, arranged at the rear face of the end cap, and operable to magnetically bias the base housing on a working surface or support surface having magnetic properties.

Example 2 may include the portable flashlight apparatus of Example 1, wherein the front housing region has a first outer perimeter, the rear housing region has a second outer perimeter, and the intermediate housing region has a third outer perimeter that is less than the first outer perimeter and the second outer perimeter.

Example 3 may include the portable flashlight apparatus of Example 2, wherein the third outer perimeter of the intermediate housing region defines a gripping surface that permits a user to maintain a grip of the base housing.

Example 4 may include the portable flashlight apparatus of Example 1, wherein the first light source comprises one or more LEDs.

Example 5 may include the portable flashlight apparatus of Example 4, wherein the color temperature of light emitted by the LEDs of the first light source is 4,500 K.

Example 6 may include the portable flashlight apparatus of Example 1, wherein the second light source comprises a laser.

Example 7 may include the portable flashlight apparatus of Example 1, wherein the third light source comprises one or more LEDs.

Example 8 may include the portable flashlight apparatus of Example 7, wherein the color temperature of light emitted by the LEDs of the third light source is 4,500 K.

Example 9 may include the portable flashlight apparatus of Example 1, further comprising a rechargeable power source arranged at the intermediate housing region.

Example 10 may include the portable flashlight apparatus of Example 9, wherein the rechargeable power source comprises a rechargeable battery.

Example 11 may include the portable flashlight apparatus of Example 9, further comprising a power charging port arranged on an outer sidewall surface of the intermediate housing region to facilitate recharging of the rechargeable battery.

Example 12 may include the portable flashlight apparatus of Example 11, wherein the power charging port comprises a USB-C port operable to facilitate a total charging time of 60 minutes to reach a full charged state of the rechargeable battery.

Example 13 may include the portable flashlight apparatus of Example 11, further comprising a charge indicator arranged on the outer sidewall surface of the intermediate housing region to visually indicate a charge status of the rechargeable power source during a recharging sequence.

Example 14 may include the portable flashlight apparatus of Example 13, wherein the charge indicator is operable to illuminate a single color that corresponds to a charge status of the rechargeable power source.

Example 15 may include the portable flashlight apparatus of Example 13, wherein the charge indicator is operable to illuminate a plurality of colors that correspond to a charge status of the rechargeable power source.

Example 16 may include the portable flashlight apparatus of Example 1, further comprising a user interface (UI) arranged on an outer sidewall surface of the front housing region.

Example 17 may include the portable flashlight apparatus of Example 16, wherein the user interface comprises: a first control switch member operable to control activation/deactivation of the LEDs of the first light source and the third light source, respectively between the plurality of operating modes, and a second control switch member arranged adjacent to the first control switch member on the outer sidewall surface of the front housing region and operable to control activation/deactivation of the laser light of the second light source between the plurality of operating modes.

Example 18 may include the portable flashlight apparatus of Example 17, wherein the first control switch member is operable to control an output/intensity of light emitted by the first light source and the third light source between the plurality of operating modes.

Example 1B may include a portable flashlight apparatus, comprising: a base housing defining an interior space, the base housing including structurally defined regions that include a front housing region, a rear housing region, an intermediate housing region extending between the front housing region and the rear housing region and an end cap that closes the interior space at the rear housing region; a light module arranged at the front housing region and operable between a plurality of operating modes, the light module including a first light source operable to emit illuminating light from the front housing region in a direction parallel to the longitudinal axis of the base housing, a second light source operable to emit laser light from the front housing region in a direction parallel to the longitudinal axis of the base housing, and a third light source operable to emit illuminating light from the front housing region in a direction perpendicular to the longitudinal axis of the base housing; and one or more magnetic elements, arranged at the rear face of the end cap, and operable to magnetically bias the base housing on a working surface or support surface having magnetic properties.

Example 2B may include the portable flashlight apparatus of Example 1B, wherein the front housing region has a first outer perimeter, the rear housing region has a second outer perimeter, and the intermediate housing region has a third outer perimeter that is less than the first outer perimeter and the second outer perimeter.

Example 3B may include the portable flashlight apparatus of Example 2B, wherein the third outer perimeter of the intermediate housing region defines a gripping surface that permits a user to maintain a grip of the base housing.

Example 4B may include the portable flashlight apparatus of Example 1B, wherein the first light source comprises one or more LEDs.

Example 5B may include the portable flashlight apparatus of Example 4B, wherein the color temperature of light emitted by the LEDs of the first light source is 4,500 K.

Example 6B may include the portable flashlight apparatus of Example 1B, wherein the second light source comprises a laser.

Example 7B may include the portable flashlight apparatus of Example 1B, wherein the third light source comprises one or more LEDs.

Example 8B may include the portable flashlight apparatus of Example 7B, wherein the color temperature of light emitted by the LEDs of the third light source is 4,500 K.

Example 9B may include the portable flashlight apparatus of Example 1B, further comprising a rechargeable power source arranged at the intermediate housing region.

Example 10B may include the portable flashlight apparatus of Example 9B, wherein the rechargeable power source comprises a rechargeable battery.

Example 11B may include the portable flashlight apparatus of Example 9B, further comprising a power charging port arranged on an outer sidewall surface of the intermediate housing region to facilitate recharging of the rechargeable battery.

Example 12B may include the portable flashlight apparatus of Example 11B, wherein the power charging port comprises a USB-C port operable to facilitate a total charging time of 60 minutes to reach a full charged state of the rechargeable battery.

Example 13B may include the portable flashlight apparatus of Example 11B, further comprising a charge indicator arranged on the outer sidewall surface of the intermediate housing region to visually indicate a charge status of the rechargeable power source during a recharging sequence.

Example 14B may include the portable flashlight apparatus of Example 13B, wherein the charge indicator is operable to illuminate a single color that corresponds to a charge status of the rechargeable power source.

Example 15B may include the portable flashlight apparatus of Example 13B, wherein the charge indicator is operable to illuminate a plurality of colors that correspond to a charge status of the rechargeable power source.

Example 16B may include the portable flashlight apparatus of Example 1B, further comprising a user interface (UI) arranged on an outer sidewall surface of the front housing region.

Example 17B may include the portable flashlight apparatus of Example 16B, wherein the user interface comprises: a first control switch member operable to control activation/deactivation of the LEDs of the first light source and the third light source, respectively between the plurality of operating modes, and a second control switch member arranged adjacent to the first control switch member on the outer sidewall surface of the front housing region and operable to control activation/deactivation of the laser light of the second light source between the plurality of operating modes.

Example 18B may include the portable flashlight apparatus of Example 17B, wherein the first control switch member is operable to control an output/intensity of light emitted by the first light source and the third light source between the plurality of operating modes.

Example 1C may include a portable flashlight apparatus, comprising: a housing defining an interior space; a light module arranged at a front end of the housing, a rechargeable battery cell disposed within the interior space, and a charging port arranged to receive a charging cable for charging the battery cell, wherein the light module is configured to output at least approximately 1,000 lumens for at least approximately 2 hours from the battery cell, and wherein the total weight of the flashlight apparatus is less than or equal to approximately 0.62 lbs.

Example 2C may include the portable flashlight apparatus of Example 1C, wherein a beam of light from the light module reaches a distance of at least 150 meters.

Example 3C may include the portable flashlight apparatus of Example 1C, wherein the charging port is a USB-C port operable to facilitate a charge rate of 15 watts and a total charging time of 60 minutes to reach a full charged state of the rechargeable battery cell.

The terms "coupled," "attached," or "connected" can be used herein to refer to any type of relationship, direct or indirect, between the components in question, and can apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action can occur, either in a direct or indirect manner.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings and specification.

CHART

| ITEM | PERFORMANCE CHARACTERISTICS |
|---|---|
| Power source | 18650 Cell 4 V 3000 mAh |
| Brightness | Max. Spot High: 1,200 lm<br>Min. Spot High: 1000 lm<br>Max. Spot Low: 200 lm<br>Min. Spot Low: 150 lm<br>Max. Flood: 250 lm<br>Min. Flood: 150 lm |
| Runtime | Max. Spot High: 4 hrs<br>Min. Spot High: 2 hrs<br>Max. Spot Low: 8 hrs<br>Min. Spot Low: 6 hrs<br>Max. Flood: 6 hrs<br>Min. Flood: 4 hrs |
| Charge time | 67 min = 100% (Min. −100min) |
| Weight | <0.62 lbs |
| Power Source Cycle Life | 400 cycles |

The invention claimed is:

1. A portable flashlight apparatus, comprising:
a base housing defining an interior space, the base housing including a front housing region, a rear housing region, and an intermediate housing region extending between the front housing region and the rear housing region;
a light module disposed in the interior space, the light module including a first light source operable to emit light from the front housing region in a first direction parallel to a longitudinal axis of the base housing and a second light source operable to emit light from the front housing region in a second direction perpendicular to the longitudinal axis of the base housing; and
a power charging port arranged on an outer sidewall surface of the intermediate housing region facing in the second direction.

2. The portable flashlight apparatus of claim 1, wherein the front housing region defines a first outer perimeter, the rear housing region defines a second outer perimeter, and the intermediate housing region defines a third outer perimeter that is less than the first outer perimeter and the second outer perimeter.

3. The portable flashlight apparatus of claim 1, further comprising a rechargeable power source disposed in the interior space, wherein the power charging port facilitates recharging of the rechargeable power source.

4. The portable flashlight apparatus of claim 1, further comprising a magnetic element arranged on the base housing and operable to magnetically bias the base housing on a surface.

5. The portable flashlight apparatus of claim 1, further comprising:

an end cap that closes the interior space at the rear housing region;

a first seal member arranged between the rear housing region and the end cap; and a second seal member arranged at the front housing region.

6. The portable flashlight apparatus of claim 1, wherein the light module further comprises a third light source operable to emit light from the front housing region in a direction parallel to the longitudinal axis of the base housing.

7. The portable flashlight apparatus of claim 1, wherein the first light source is operable to emit illuminating light and the second light source is operable to emit illuminating light.

8. The portable flashlight apparatus of claim 1, further comprising a user interface arranged on an outer sidewall surface of the front housing region.

9. The portable flashlight apparatus of claim 8, wherein the user interface includes a control switch member that is operable to control a plurality of operating modes of the first light source and the second light source.

10. The portable flashlight apparatus of claim 1, wherein the first light source comprises one or more light emitting diodes (LEDs) and the second light source comprises a plurality of LEDs.

11. A portable flashlight apparatus, comprising:

a base housing defining an interior space, the base housing including a front housing region, a rear housing region, and an intermediate housing region extending between the front housing region and the rear housing region;

a first seal member arranged at the rear housing region;

a second seal member arranged at the front housing region;

a light module disposed in the interior space, the light module including a first light source operable to emit illuminating light of at least approximately 300 lumens from the front housing region in a first direction parallel to a longitudinal axis of the base housing and a second light source operable to emit illuminating light of at least approximately 300 lumens from the front housing region in a second direction perpendicular to the longitudinal axis of the base housing; and a power charging port arranged on an outer sidewall surface of the intermediate housing region facing in the second direction.

12. The portable flashlight apparatus of claim 11, further comprising a magnetic element arranged on the base housing and operable to magnetically bias the base housing on a surface.

13. The portable flashlight apparatus of claim 11, further comprising a user interface arranged on an outer sidewall surface of the front housing region.

14. The portable flashlight apparatus of claim 13, wherein the user interface includes a control switch member that is operable to control a plurality of operating modes of the first light source and the second light source.

15. A portable flashlight apparatus, comprising:

a base housing defining an interior space, the base housing including a front housing region, a rear housing region, and an intermediate housing region extending between the front housing region and the rear housing region;

a light module disposed in the interior space, the light module including a first light source operable to emit light from the front housing region in a first direction parallel to a longitudinal axis of the base housing and a second light source operable to emit light from the front housing region in a second direction perpendicular to the longitudinal axis of the base housing, wherein the light module is configured to output at least approximately 1,000 lumens for at least approximately 2 hours; and a power charging port arranged on an outer sidewall surface of the intermediate housing region facing in the second direction, wherein a total weight of the portable flashlight apparatus is less than or equal to approximately 0.62 lbs.

16. The portable flashlight apparatus of claim 15, wherein a beam of light from the light module reaches a distance of at least approximately 150 meters.

17. The portable flashlight apparatus of claim 15, further comprising a rechargeable power source disposed in the interior space, wherein the power charging port is operable to facilitate a charge rate of approximately 15 watts and a total charging time of approximately 60 minutes to reach a full charged state of the rechargeable power source.

* * * * *